United States Patent [19]

Anderson et al.

[11] Patent Number: 5,597,503
[45] Date of Patent: Jan. 28, 1997

[54] AXIALLY ASSEMBLED ENCLOSURE FOR ELECTRICAL FLUID HEATER HAVING A PERIPHERAL COMPRESSION RING PRODUCING A DIAMETRICALLY BALANCED FORCE

[75] Inventors: James G. Anderson, Beaver Dams; Thomas A. Collins, Horseheads; Leslie E. Hampton, Corning; G. Daniel Lipp, Painted Post; Alfred N. Mack; David S. Weiss, both of Corning, all of N.Y.

[73] Assignee: Corning Incorporated, Corning, N.Y.

[21] Appl. No.: 459,851

[22] Filed: Jun. 2, 1995

[51] Int. Cl.⁶ .................. H05B 3/10; F01N 3/10
[52] U.S. Cl. .............. 219/552; 60/300; 55/DIG. 30; 422/174; 422/180; 392/485
[58] Field of Search ................ 219/552–553; 392/485, 488; 60/300; 55/DIG. 30; 422/179–180, 199, 211

[56] References Cited

U.S. PATENT DOCUMENTS

| | | | |
|---|---|---|---|
| 3,228,755 | 1/1966 | Lottinville | 422/179 |
| 4,115,071 | 9/1978 | Masuda et al. | 422/179 |
| 4,142,864 | 3/1979 | Rosynsky et al. | |
| 4,207,661 | 6/1980 | Mase et al. | |
| 4,413,392 | 11/1983 | Otani et al. | |
| 4,556,543 | 12/1985 | Mochida et al. | 422/171 |
| 4,985,212 | 1/1991 | Kawakami et al. | 422/179 |
| 5,053,062 | 10/1991 | Barris et al. | 55/DIG. 30 |
| 5,194,719 | 3/1993 | Merkel et al. | |
| 5,254,840 | 10/1993 | Thompson | |
| 5,318,756 | 6/1994 | Sheller et al. | 422/174 |
| 5,376,341 | 12/1994 | Gulati | 422/179 |
| 5,433,926 | 7/1995 | Swars | 42/174 |

OTHER PUBLICATIONS

Appln. No. 08/298,337; filed Aug. 30, 1994, "Axially Assembled Enclosure for Electrical Fluid Heater and Method".

*Primary Examiner*—Teresa J. Walberg
*Assistant Examiner*—Raphael Valencia
*Attorney, Agent, or Firm*—K. van der Sterre

[57] ABSTRACT

A metal honeycomb heating element is protectively mounted in an enclosure comprising a one-piece enclosure wall, the heater being supported between a circumferential support member and a circumferential compression ring attached to the enclosure wall. A diametrically balanced compressive force is maintained on the edges of the heating element by the compression ring and support, this force operating to significantly extend the life of the heater element under hot vibration. Heater slot separators and electrode feedthrough structures for extending the life of the heater element are also provided.

7 Claims, 3 Drawing Sheets

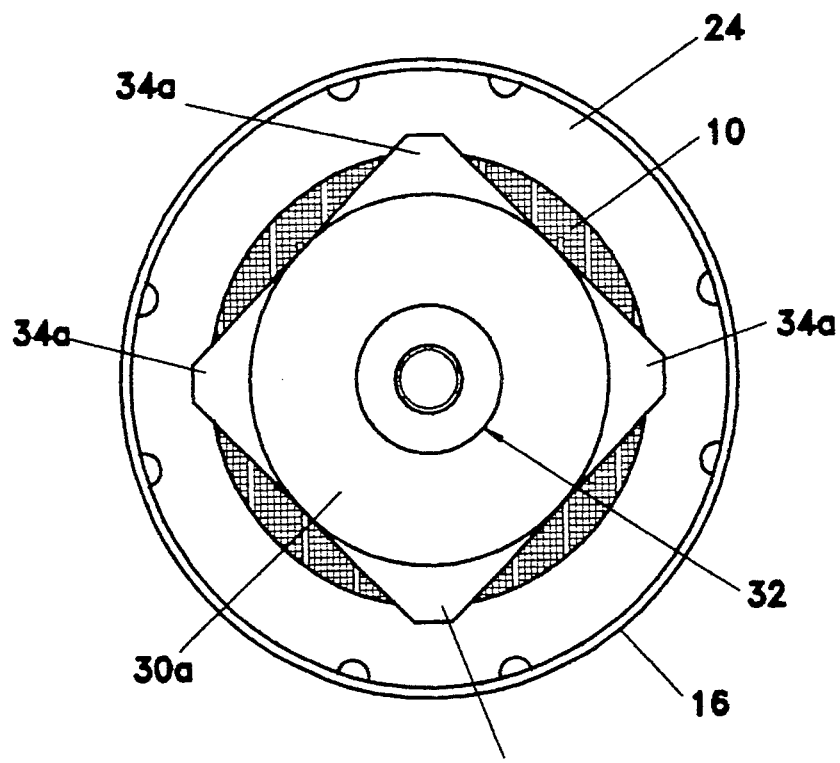
FIG. 5
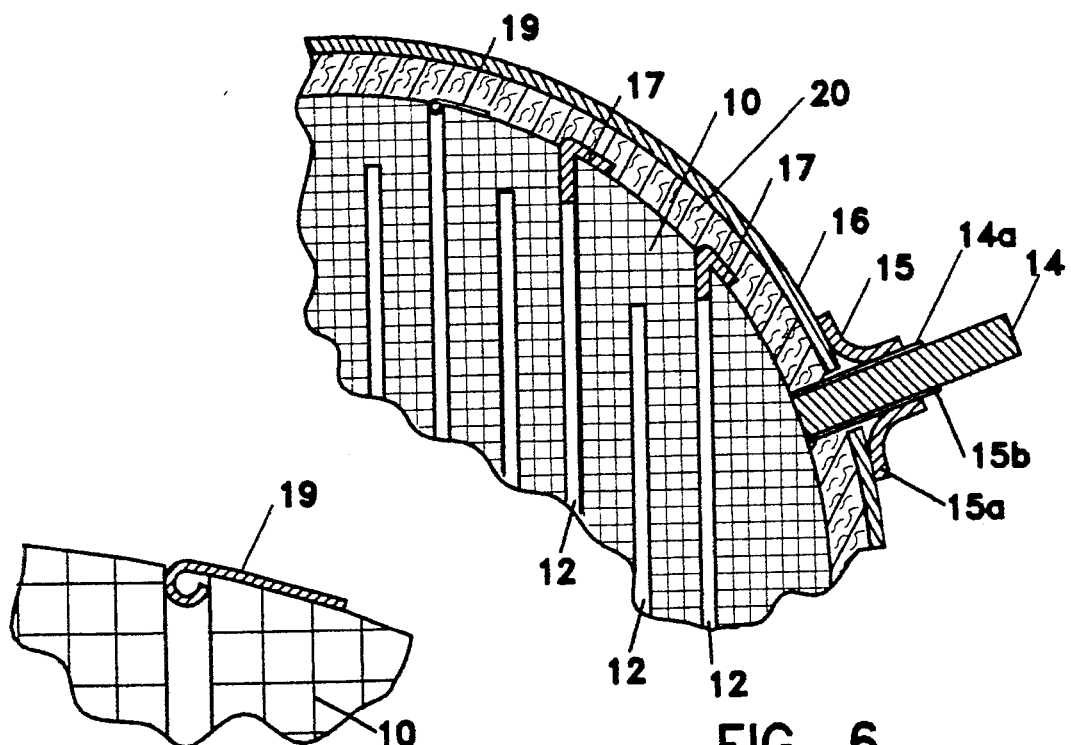
FIG. 6
FIG. 6a

5,597,503

AXIALLY ASSEMBLED ENCLOSURE FOR ELECTRICAL FLUID HEATER HAVING A PERIPHERAL COMPRESSION RING PRODUCING A DIAMETRICALLY BALANCED FORCE

BACKGROUND OF THE INVENTION

The present invention relates to electrically heated catalytic converter modules for automotive exhaust gas treatment systems. More particularly, the invention relates to an improved design and assembly method for an electric heater enclosure for such treatment.

A number of exhaust system designs are being considered to meet targeted exhaust emissions requirements for ultra-low emission vehicles (ULEV requirements). Among the designs being considered are those employing an electrically powered fluid heater positioned upstream and adjacent to an oxidation catalyst unit. The electric heater heats the exhaust gas and catalyst unit during initial or "cold-start" engine operation, thereby advancing the onset of catalytic oxidation and reducing the emission of hydrocarbons (unburned fuel) otherwise emitted during that operation.

Attempts to contain and protect these heaters in the exhaust stream have involved approaches similar to those used to mount or "can" ceramic honeycomb catalyst substrates. These include the use of axially assembled enclosures such as described in U.S. Pat. No. 4,207,661 to Mase et al. Included in those enclosures are front and rear supporting members composed of a resilient material for supporting the catalytic converter substrate within the enclosure while shielding it from mechanical shocks.

U.S. Pat. Nos. 4,142,864 and 4,413,392 disclose the packaging of similar ceramic substrates by "stuffing" the substrates into cylindrical can segments, followed by the attachment of retaining rings and or conical end caps to the can segments. Axial assembly in the manner of the above patents is advantageous in that the number of components required to securely encase the catalytic substrate within the shielding metal container is relatively small, and in that tight axial constraint of the substrates within the enclosures is easy to achieve.

However, substantial difficulties relating to service life have been encountered in adapting the techniques of ceramic substrate canning to the canning of extruded metal honeycomb heaters used for the preheating of exhaust gases for subsequent catalyst treatment. This is largely because metal heater units, being composed of thin metal, are relatively ductile and thus somewhat more prone to vibration damage than ceramic honeycombs.

The durability requirements for metal heaters will be as stringent as those for ceramic honeycombs used as automotive catalyst supports. The enclosure system used must provide environmental and physical protection adequate to enable the heaters to meet government mandated standards for maximum allowed levels of non-methane hydrocarbons, CO, and nitrogen oxides for up to 100,000 miles of automobile use. Up to 50,000 engine starting cycles as well as severe thermal cycling, extreme temperatures, and high temperature vibration will be encountered by the heaters during this interval.

One previous approach to the containment of electrical honeycomb heaters, described in a co-pending, commonly assigned patent application for an "Axially Assembled Enclosure For Electrical Fluid Heater and Method", filed Aug. 30, 1994 by L. S. Rajnik et al., uses a two-piece enclosure wherein the heater is supported by compression between two halves of a steel enclosure welded together. These can halves are designed to firmly support and protect the honeycomb and associated insulating matting material from vibration damage in use.

While approaches such as above have been effective to substantially extend the service life of these heaters, they have not fully met the most stringent service life requirements, particularly under the more severe vibrational conditions of the hot exhaust environment.

It is therefore a principal object of the present invention to provide an improved metal honeycomb heater assembly useful in the treatment of engine exhaust gases which offers significant improvements in heater durability under conditions approximating the environment of use.

It is a further object of the invention to provide a canning method applicable to the canning of extruded metal honeycombs which provides a durably contained heater unit exhibiting high resistance to hot vibration damage over a prolonged period.

Other objects and advantages of the invention will become apparent from the following description.

SUMMARY OF THE INVENTION

The present invention arose from a study of the causes of vibrational heater failure in heater enclosures employing edge compression for heater protection and support. In the case of two-piece enclosures such as described above, wherein heater support consisted primarily of edge compression axially applied to the heaters, our studies indicate that failure in vibration is due in many cases to insufficient edge compression in the final assemblies, perhaps caused by the adverse effects of final welding steps on stress distribution within the enclosures.

To overcome these difficulties the invention employs a one-piece enclosure in combination with a novel axial mounting technique to secure a uniform, predictable, and reproducible level of compressive force on the heaters during assembly. The result is a significant and unexpected improvement in heater durability under both hot and cold vibration.

Still further improvements in heater durability are achieved through the use of enhanced heater slot separation methods and elements, and better heater electrode sealing configurations.

In a first aspect the invention comprises an electric heater module for heating a gas stream which includes a one-piece cylindrical metal enclosure formed by a wall member of closed-curved configuration. Within the channel formed by that enclosure is provided a circumferential support member, connected with the inner surface of the wall and extending into the channel to form a first peripheral support surface for a heater.

A conductive metal honeycomb heating element is positioned within and disposed across the channel, closely adjacent to the support member. That element is provided with at least one layer of refractory resilient insulation material, disposed around its outer edge surfaces to protectively separate and insulate it from wall and support surfaces. With this layer of insulation intervening, the peripheral (circumferential) edge of the heating element rests on and is supported within the channel by the peripheral support surface of the support member.

In the channel next to the heating element and in proximity to its second or opposing edge surface is an annular compression ring. Like the support member adjacent the opposing peripheral surface of the heating element, this ring is attached to the inner surface of the wall and extends into the channel to form a second peripheral support surface for the opposing heater edge surface, the later again being covered by one or more layers of the insulation material.

To support the heating element in a manner insuring adequate protection from motion damage, the compression ring is fastened to the inner wall of the enclosure at a location sufficiently close to the opposing heater support member to develop a predetermined level of pressure through the resilient mat material on the heating element. For the mounting components and procedures of the invention that force level will be in the range of about 620–2760 kPa (90–400 psi).

The invention additionally includes a method for mounting a metal honeycomb heating element in a one-piece enclosure such as hereinabove described. That method includes first providing a cylindrical metal enclosure in the form of a one-piece closed-curved wall member, the wall incorporating a circumferential support member on its inner surface. The support member extends into the channel formed through the enclosure to form a first peripheral support surface for the heating element.

A conductive metal honeycomb heating element is positioned across the channel adjacent to the support member but with at least one layer of refractory resilient insulation material being provided between the heating element and each of the wall member and first peripheral support surface. An annular compression ring is then placed in the channel in proximity to the heating element, again while providing at least one layer of refractory resilient insulation material between the heating element and the compression ring.

To mount the heater in the enclosure the compression ring is urged against the insulation material, heating element, and support member by applying a balanced force to the ring at multiple discrete pressure points about the ring circumference. This balanced force is sufficient to develop a compressive force in the range of about 620–2760 kPa (90–400 psi) on the insulation material and heating element. While maintaining the compressive force thus generated the ring is permanently attached to the enclosure wall at multiple attachment points about the periphery of the heater. Point attachment, rather than seam welding of the ring to the enclosure wall, is used.

In a particularly preferred embodiment of the above method, the force applied to the compression ring during attachment is applied by a rigid mounting plate which has multiple radially-outwardly-extending protrusions contacting the compression ring at multiple discrete pressure points about the ring circumference. The recesses between these protrusions expose the compression ring while the ring, insulation and heater element remain under compression, Accordingly, easy access to the joint between the ring and enclosure wall, for convenient point attachment of the ring to the wall while maintaining pressure on the heating element, is provided.

Electrical heater enclosures produced as above described can be designed with features which permit convenient mating with other components of the exhaust system. For example, provision can be made for convenient mating with a light-off catalyst module, in order to provide a rugged electrically heated catalyst module as a single unit.

A particular advantage of the invention is that it significantly extends the service life of the heater element, due to the improved uniformity and degree of control over the pressure applied to the honeycomb heater by the support member and compression ring. Maintaining uniform and controlled pressure in the final assembly minimizes the adverse effects of thermal and mechanical stresses on heater integrity which have in the past limited heater service life.

DESCRIPTION OF THE DRAWINGS

The invention may be further understood by reference to the appended drawings wherein:

FIG. 5 is a schematic top plan view of alternative tooling for use with the assembly shown in FIG. 3;

FIG. 6 is a partial schematic cross-sectional view of heater slot separation and electrode sealing means provided according to the invention; and FIG. 6a is an enlarged schematic illustration of a slot separator of FIG. 6.

DETAILED DESCRIPTION

Electrical heating elements useful in the practice of the invention include any of the heater types being developed for the electrical heating of exhaust gas effluents. The preferred heaters are extruded metal honeycombs, examples of which are disclosed in U.S. Pat. Nos. 5,254,840 and 5,194,719. Alternatively, heaters comprised of sheet metal and fabricated by wrapping metal foil into channeled honeycomb configurations can be used.

Figure 1:
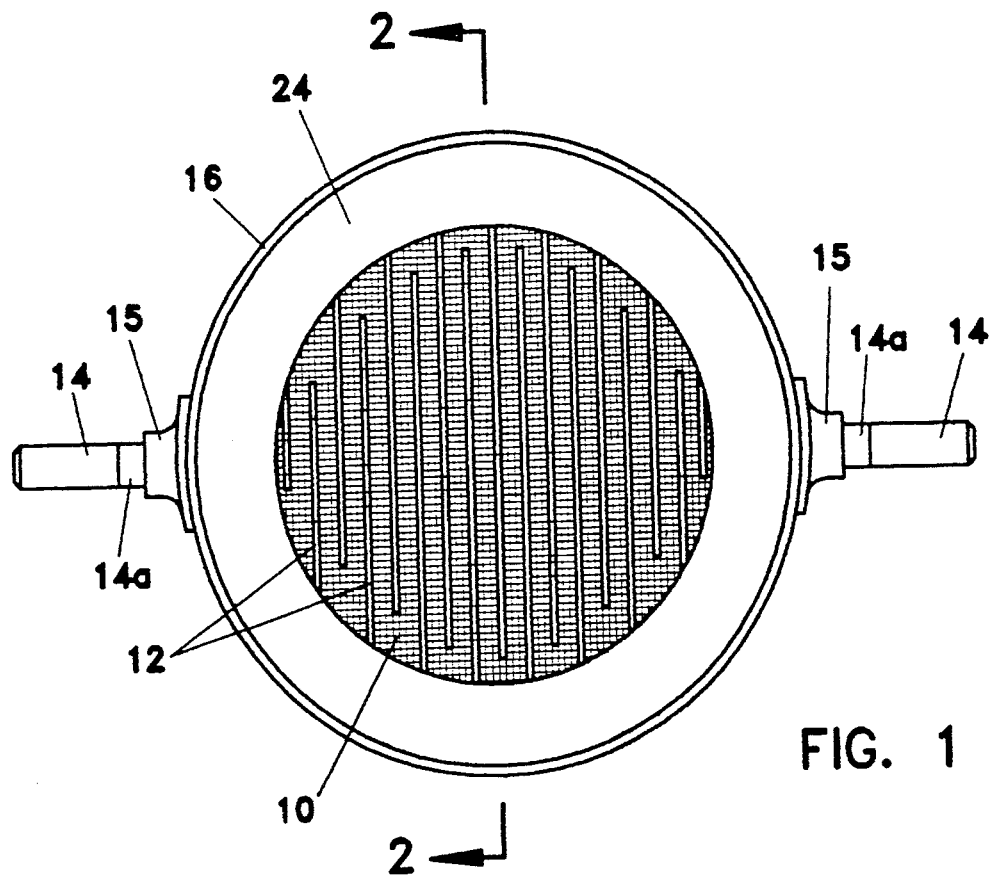
FIG. 1 is a schematic end view in cross-section of an assembly comprising an electrical honeycomb heater supported within a one-piece enclosure in accordance with the invention.
Figure 2:
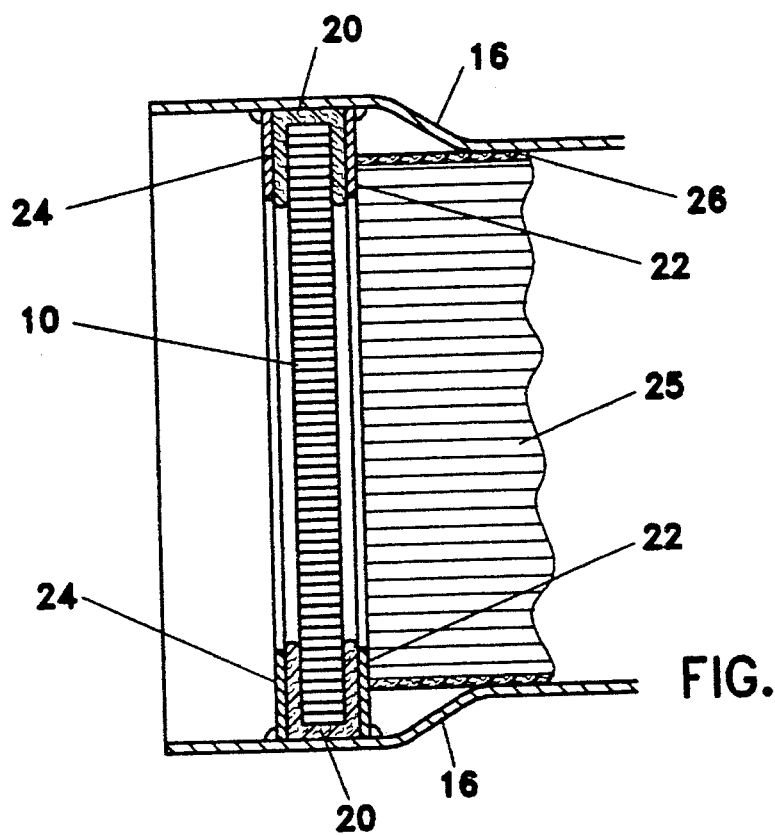
FIG. 2 is a schematic side view in cross-section of the assembly of FIG. 1.

In the case of extruded metal honeycomb heating elements, such as best illustrated in FIGS. 1 and 2 of the drawing, the particularly preferred configuration is a round disk 10 of extruded metal honeycomb material having the channels or cells running axially through the thickness of the disk. Slots exemplified by slots 12 are cut into the edges of the disk through the disk cross-section by removing some of the cell walls. These slots are designed to create a serpentine conductive path across the diameter of the disk between powering electrodes, in order to increase the electrical path length and resistance of the disk for more efficient electrical heating at typical motor vehicle battery or alternator voltages.

Powering electrodes or leads in the form of heavy metal leads or studs 14 are welded to opposing edges of the metal honeycomb disk 10 at opposite ends of the serpentine path. These leads serve as the electrodes for connection to an electrical power source. In the embodiment shown, each lead is encased in insulating ceramic material 14a to electrically isolate it from close-fitting flared tube electrode sealing elements 15 attached to enclosure 16 in which the heater is contained.

As is known, slots 12 in honeycomb 10 are preferably kept open by the insertion of insulating separators. Conventionally, these are formed of a refractory electrically insulating material such as an alumina ceramic, and are retained in holes drilled into each slot from the perimeter of the honeycomb. As hereinafter more fully described, insulating separators formed of dielectrically coated metal tabs provide a more vibration-resistant heating element for the present purpose.

To electrically insulate and mechanically isolate the metal honeycomb from surrounding enclosure 16, a layer of resilient insulating mounting material 20 is provided around the honeycomb. This layer, which may be formed of any electrically insulating, refractory, woven or non-woven resilient material, must be sufficiently refractory to resist deterioration at maximum exhaust system temperatures and sufficiently durable to withstand prolonged vibration and moderate to severe mechanical shocks.

The mounting material must also be sufficiently resilient to transmit the required level of diametrically balanced preloading force to the honeycomb heater, and to retain that force at high use temperatures. Preferred materials for the resilient mounting material are woven mat materials formed of refractory fibers, although non-woven mats or even resilient insulating foam materials, if sufficiently resilient and refractory, could alternatively be employed.

In the preferred embodiment of FIGS. 1 and 2, tubular metal enclosure 16 is formed as a one-piece cylindrical steel tube of circular cross-section surrounding heater 10, with the heater being disposed within and across the cylindrical channel formed by the tube. Also positioned within tube 16 is a circumferential support member 22 for heater 10, that member being permanently connected to an inner surface of the wall of enclosure 16.

Connection of the support member 22 to the wall of enclosure 16 can be by means of welding or other permanent bonding. Alternatively, the support can be directly formed in the wall by shaping the wall to provide the necessary peripheral support surface for the heater. In either case, the heater support surface extends sufficiently inwardly into the channel formed by the cylindrical wall of tube 16 so that it can provide the necessary edge support for the peripheral edge of the heating element.

Opposing the support member within the channel, i.e., on the side of the heater opposite the support member, is peripheral compression ring 24. As shown in FIG. 2, compression ring 24 will extend from the wall of tube 16 into the channel a distance sufficient to provide a second peripheral support surface of substantially the same size and shape as that provided by support member 22 which it opposes. Compression ring 24 is attached to the wall of tube 16 at a position such that, in cooperation with support member 22 and a resilient mounting material 20, it applies a diametrically balanced compressive force on peripheral edge portions of heater 10 which are positioned between support 22 and compression ring 24. It is important to provide one or more layers of resilient mounting material 20 between those edge portions and each of support member 22, compression ring 24, and the inner surface of tube 16, in order to develop the necessary compressive force on heater 10 without damaging the peripheral edge thereof.

The spacing of compression ring 24 from support member 22 is set to develop a predetermined level of compressive force on heater 10. That force is at a level sufficient to firmly contain the heater, and is balanced to insure extended heater life. Typically, preloading forces in the range of about 668–2670N (150–600 lbf), generating pressures in the 620–2760 kPa (90–400 psi) range on the edge portions of the honeycombs supported by the circumferential support member and compression ring, are used. These forces will provide the shock protection necessary for extended heater life provided that the forces are diametrically balanced across the heater in the final assembly, as hereinafter more fully described.

Mounted heaters such as shown in FIGS. 1–2 are particularly useful to preheat honeycomb-supported catalysts mounted in close proximity thereto. Such catalysts will preferably be mounted in the same enclosure, in the manner of catalyzed honeycomb 25 which is partially shown in cross-section in FIG. 2. The diameter of enclosure 16 can be adjusted upwardly or downwardly as needed to tightly contain honeycomb 25 within a resilient mounting material 26 closely behind heater element 10, to obtain the most efficient heating of the catalyst.

Figure 3:
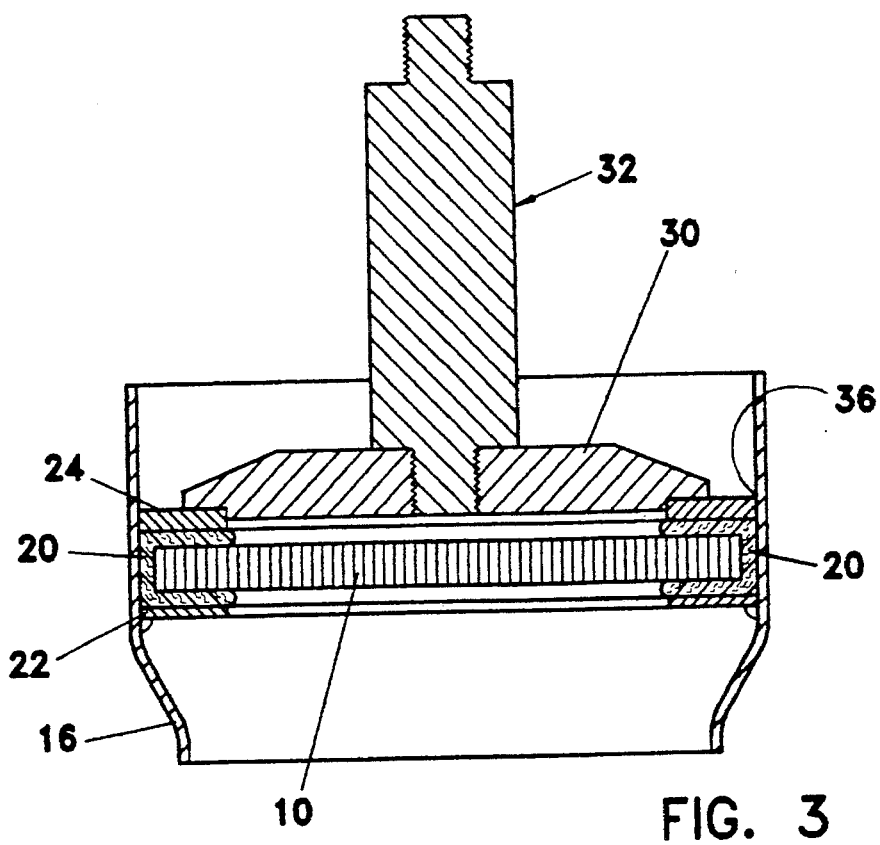
FIG. 3 is a schematic side elevational view in cross-section of the assembly of FIGS. 1 and 2 during assembly with tooling for the mounting pre-compression of the heater within the enclosure.
Figure 4:
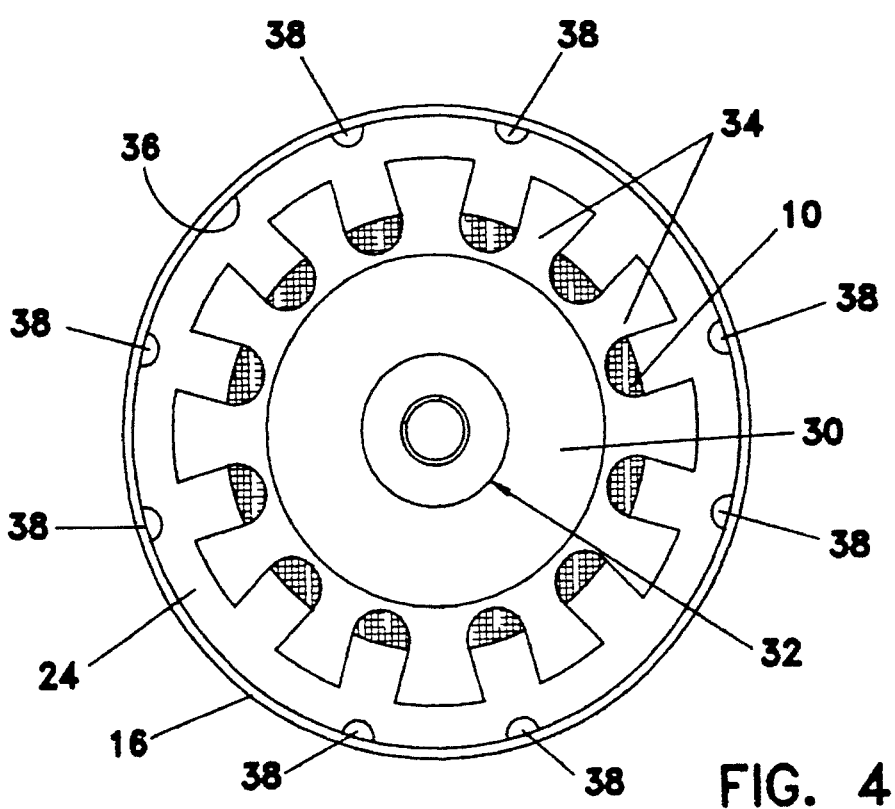
FIG. 4 is a schematic top plan view of the assembly and tooling shown in FIG. 3.

A method and apparatus for mounting an electrical heater in a one-piece cylindrical enclosure as above described are illustrated in FIGS. 3–5 of the drawings. The apparatus comprises tooling for developing a balanced or uniform preloading force across the heater as the compression ring is attached to the enclosure.

As shown in FIGS. 3 and 4, a metal honeycomb heater element 10 provided with an edge covering of a refractory resilient mat material 20 is set into cylindrical metal enclosure 16 and across the opening in that enclosure. The heater and mat are positioned so that the mat and edge portion of heater 10 are resting on the peripheral support surface provided by the extension of support member 22 into the opening containing the heater. Mat 20 also separates heater 10 from the adjacent wall portion of enclosure 16.

Compression ring 24 is placed in the enclosure so that it covers the peripheral edge of heater 10, but with mat 20 positioned between the ring and heater. Compression tooling consisting of a pressure plate 30 and post 32 is then placed into the opening and over compression ring 24 so that the plate is centered on the ring and contacts it uniformly about its periphery.

A compressive force in the range of about 668–2670N (150–600 lbf) is applied to the post and pressure plate to urge compression ring 24 against the insulation material. This force is sufficient to generate a compressive force in the range of about 620–2760 kPa (90–400 psi) on opposing sides of heater 10. Due to the rigidity of the tooling and the centering of the pressure plate on the ring, the compressive force applied to the heater is diametrically balanced across the heater. That is, the compressive force at any one point on the heater periphery is of substantially the same magnitude as the compressive force at the diametrically opposite point.

To maintain the level of balanced force on heater element 10, through the compression ring attachment procedure and during heater use, compression ring 24 is permanently affixed to the inner wall of enclosure 16 by multiple-point attachment, rather than seam attachment, of ring 24 to the wall. As best seen in FIG. 4, to facilitate multiple point attachment, pressure plate 30 is provided with multiple radially outwardly extending protrusions such as protrusions 34, these being separated by radially inwardly extending recesses or cutouts located at selected locations about the plate circumference.

The recesses extend inwardly from the outer circumference of the pressure plate defined by protrusions 34, and thus expose the joint 36 between the wall of enclosure 16 and ring 24 to facilitate attachment of the ring to the wall. For example, exposure of the joint offers room for welding or other fastening at selected points while still maintaining the initially applied controlled heater preloading force on the ring.

The attachment of the ring to the wall is most preferably accomplished by TIG (tungsten inert gas) welding, although any other attachment method which avoids excessive compaction or shrinkage of the compression ring, ring-wall attachment points, and/or bonding material could equivalently be used. Welds 38 in FIG. 4 are illustrative of one multiple-point attachment pattern, although other patterns, including welding at all of the recesses about the periphery of the ring, could be used. In this regard it is important to avoid seam welding approaches to maintain compression, as these approaches typically involve substantial weld compaction effects which are thought to significantly interfere with achieving and maintaining the required levels of compression on the heater.

FIG. 5 of the drawing illustrates an alternative form of a pressure plate, in this case a plate 30a of generally square configuration. This configuration forms four cutouts for ring/wall access separated by four radially outwardly extending protrusions (corners) 34a which apply predetermined compressive force to ring 24 and heater 10. When urged against the ring, this plate applies balanced but preferential force to four opposing sections of the ring and heater element.

It is also important that preferential loading as provided by the pressure plate of FIG. 5 be applied at least to points on the heater periphery where the honeycomb separator slots and associated beams of the metal honeycomb heater are at their longest, i.e., spanning the greatest distance across the channel of enclosure 16. These sections of the heater are thought to exhibit the greatest susceptibility to flexure and damage during the hot vibration encountered in use, and so maintaining proper edge compression at these locations is particularly critical to extended heater life.

As noted above, the preferred conductive metal honeycomb heating element used in these assemblies is an extruded metal honeycomb in the form of a flat disk configured as disk 10 in FIGS. 1 and 2, this disk being of predetermined diameter and thickness and comprising multiple through-channels traversing the thickness. As shown in FIGS. 1 and 6, the honeycomb disk incorporates multiple slots 12 extending inwardly from the diameter, these conventionally being held separate along their length by dielectric rod or pin separators located near the disk outer diameter, such as shown in U.S. Pat. No. 5,194,719.

It has now been found that, under severe vibration, such dielectric pins can loosen and shift, inflicting damage on the metal honeycomb. For improved protection from vibration damage, then, heater units provided according to the invention incorporate anchored tab slot separators instead of the dielectric pins of the aforementioned patent. These separators are most preferably formed of sheet metal and are provided with a dielectric coating at least on portions thereof in contact with wall segments of the slots. The segments of the separators extending from the slots along the circumferential surface of the heating element provide the means for permanently attaching or anchoring the separators to the heater surface, to prevent shifting in use.

FIG. 6 illustrates two different configurations for such anchored slot separators. Separators 17 are angled flat components including folded flat insulated segments extending downwardly into slots 12 and flat metal segments extending from the slots along the circumferential outer surface of heater 10, the latter segments being permanently attached to the heater, e.g., by welding. As shown in more detail in FIG. 6a, separator 19 is similarly fastened to the surface of the heating element, but includes a cylindrical rather than flat insulated end extending downwardly into slot 12.

The configuration of separator 19 offers a particular advantage in that the segments for fitting into the slots are cylindrical. As a consequence, these slot separators will fit into any slot regardless of the angle between the slot and the perimeter surface of the heater. Separator 17, in contrast, must be specifically shaped for each slot location, in order that the angle between the slot-fitting segment and extending portion is set to obtain the best fit to both the slot and the heater perimeter at that location.

A suitable dielectric coating material for the downwardly extending ends of these separators is alumina, although other dielectric coating materials exhibiting adequate temperature and durability characteristics could be used. Examples of suitable metals for the tabs include Kanthal(TM) metal foil and stainless steel.

As noted above, heating elements 10 such as shown in FIGS. 1, 2 and 6 are generally provided with one or more stud electrodes 14 extending from the heater outwardly of the heater enclosure 16 for applying electrical power thereto. As best seen in FIG. 6, each metal stud electrode 14 is welded to the outer circumferential surface of the heater disk 10 and extends outwardly of the enclosure via a feedthrough in the wall of enclosure 16.

In a preferred embodiment of the heaters of the present invention, each electrode feedthrough includes a gas-tight assembly formed by the electrode 14, the enclosure wall 16, and a flared metal tube fitting 15 having a flared end 15a and a tubular end 15b. Tubular end 15b of this fitting forms a gas-tight seal around dielectric coating 14a on electrode 14, while flared end 15a is used to form a gas-tight seal against the wall of enclosure 16.

The seal between flared end 15a and wall member 16 may suitably be provided by welding the end to the wall. An advantage of this type of fitting is that the edge of flared end 15a is sufficiently spaced from the feedthrough opening that damage to internal heater components during welding is minimized.

The seal between tube end 15b and electrode 14 with coating 14a can be obtained by the introduction of sealing material between the coating and tube, or by a shrink-fitting procedure. The latter procedure comprises heating the fitting to expand it, e.g., to 800° C., and then dropping it over the electrode and onto the enclosure wall where it contracts on cooling to form a gas-tight seal against electrode coating 14a.

The invention will be further described by the following example, which is intended to be illustrative rather than limiting.

EXAMPLE

An extruded metal honeycomb disc for a heater element, being about 9.3 cm (3.66 in) in diameter and 0.762 cm (0.300 in) in thickness and incorporating edge slotting as seen in FIG. 1 of the drawing is provided. To opposing outer edges of this honeycomb disc are attached two opposing electrodes for electrical contact with the disc, each electrode consisting of a stainless steel stud about 8 mm in diameter which is welded to the disc for electrical contact. Each stud supports an insulating ceramic coating on its side surfaces.

A wrap of woven insulation in the form of a fibrous mat is draped around the perimeter of the honeycomb. This mat, formed of Nextel® ceramic fiber mat material commercially available from the 3M Company, Minneapolis, Minn., has insulating and electrical characteristics suitable for thermally and electrically isolating the heater from surrounding metal. The wrap includes opposing holes through which the electrode studs can protrude.

The wrapped heater element thus provided is inserted with its surrounding wrap into the end opening of a cylindrical stainless steel tube of circular cross-section about 9.9 cm (3.9 in) in diameter such as shown in FIGS. 1 and 2 of the drawing. Within the channel formed by the tube is a circular support member in the form of a flat stainless steel ring about 0.318 cm (0.125 in) in thickness, 9.88 cm (3.89 in) in outer diameter, and 8.2 cm (3.24 in) in inner diameter, welded to the inside of the tube wall. This ring is disposed with its center axis parallel with the center axis of the channel. The tube sidewall is provided with slots to accommodate the electrodes, these slots then being subsequently filled by welding slot covers into the open slots.

The wrapped heater element is positioned on the ring support member and a second or compression ring of dimensions similar to that of the first ring is positioned over the wrapped heater element. A tool consisting of a compression plate and post is then placed over the compression ring and in edge contact with the ring but not the heater. The compression plate has 12 radially inwardly extending recesses about its circumference which expose the width of the compression ring and the gap between the ring and the wall of the steel tube.

A force of 1335 N (300 lbf) is applied to the post and pressure plate to force the compression ring toward the heater and support ring, this force being sufficient to develop a pressure of about 896 kPa (130 psi) on the edge surfaces of the metal heater element covered by the rings. While maintaining this pressure the compression ring is welded to the inner wall of the tube at each of the twelve points about the circumference of the ring located opposite the recesses on the compression plate, using TIG welding apparatus. The TIG welds are sufficiently small that no significant movement of the ring due to weld compaction occurs. Therefore, the balanced compressive force developed by the pressure plate on the heater periphery is maintained.

Durability testing of the heater contained within the enclosure as above described is carried out under environmental conditions designed to approximate those encountered in an automotive exhaust environment. The tests used are vibration tests, involving hot (900° C.) and ambient temperature vibration of assembled units at vibration rates of 100 and 185 hertz and at accelerations of 28 and 60 G. For the hot vibration tests, gas at the temperature noted is passed through the assembled heater enclosure until an equilibrium temperature distribution is reached. The axis of vibration of the units is either axial (parallel with the flow-through axis of the honeycomb heater) or at a 45° angular offset from the flow-through axis. Test durations range from 10–100 hours.

Vibration testing applies repeated flexural stress to the heater element, and can be particularly damaging at the higher test temperature where metals are more susceptible to damage from fatigue. The 45° vibration test is significantly more severe than the axial vibration test because of the shear forces exerted on the honeycomb heater and mat by the compression rings during vibration. A mounted honeycomb heater unit is considered to pass a vibration test if it exhibits no significant honeycomb damage after the test, as determined from both visual examination and electrical testing of the heater.

Enclosed heater elements produced in accordance with the foregoing Example, i.e., mounted using compression tooling such as disclosed in FIG. 4 of the drawing, exhibit significantly improved resistance to 45° vibration damage. Typically, such units can readily pass vibration testing which includes 10 hours of hot (900° C.) vibration at 45°, 60 g and 185 Hz, followed by 30 hours of the same vibration at room temperature.

Still further enhancements in heater durability can be realized using compression plate mounting as illustrated in FIG. 5 of the drawing. The following Table sets forth the results of tests conducted on heater units provided using such mounting, the mounting force of approximately 670 N (150 lbf) having been preferentially applied to the compression rings at points proximate to the slot or beam ends of the slotted honeycomb heaters to be mounted, and at points 90° offset therefrom. While maintaining this force, attachment of the compression ring to the enclosure wall by TIG welding at eight points proximate to the extending corners of the compression plate, as illustrated in FIG. 5 of the drawing, completed the mounting of the heaters.

Included in the Table for each of the units tested are the acceleration force applied during vibration, the vibration frequency, the temperature of the unit during testing, the vibration axis for the test, whether axial (parallel with the enclosure axis of the unit) or at a 45° angle from the enclosure axis, and whether the unit passed (P) or failed (F) the combined electrical/mechanical examination at the end of the test. As is evident from the Table, very high (100 hour) resistance to 45° hot vibration damage can be achieved by the application of balanced preferential mounting pressure at the beam ends of the heater as above described.

TABLE I

| Vibration Tests - Compression Plate Mounting | | | | | |
|---|---|---|---|---|---|
| Acceleration | Vibration Frequency | Temp. (°C.) | Duration | Vibration Direction | Pass (P)/ Fail (F) |
| 28 g | 100Hz | 900° C. | 100 hr | axial | P |
| 28 g | 100HZ | 900° C. | 100 hr | 45° | P |
| 60 g | 185Hz | 900° C. | 10 hr | axial | P |
| 60 g | 185Hz | 900° C. | 100 hr | 45° | P |
| 60 g | 185Hz | RT | 30 hr | 45° | P |

Prior art heater mounting methods which do not use balanced compression approaches tend to produce mounted units resistant to axial vibration damage, but overly susceptible to damage under off-axis vibration. Table II below sets forth vibration test results for enclosed heaters assembled by axially compressing the honeycomb heater elements between enclosure halves containing fixed stops for heater support. We attribute the failures in 45° vibration testing of such units to the difficulty of developing and maintaining balanced mounting pressure on the heater elements during assembly of the enclosures.

TABLE II

| Vibration Tests - Comparative Samples | | | | | |
|---|---|---|---|---|---|
| Acceleration | Vibration Frequency | Temp. (°C.) | Duration | Vibration Direction | Pass (P)/ Fail (F) |
| 28 g | 100Hz | 900° C. | 100 hr | axial | P |
| 28 g | 100Hz | 900° C. | 100 hr | 45° | F |
| 60 g | 185Hz | 900° C. | 10 hr | axial | P |
| 60 g | 185Hz | 900° C. | 10 hr | 45° | F |
| 60 g | 185Hz | RT | 30 hr | 45° | F |

The probability of vibration failure appears to increase in the case of low heater compression adjacent the beam or slot ends of slotted heaters. For example, one early procedure, comprising the application of mounting pressure at points 45° offset from the beam ends of the heater, produced enclosed units failing within 30 minutes under hot (950° C.) vibration at 185 Hz (45°) and 60G. Even at ambient temperatures, heater failure occurred within 5 hours under these vibration conditions.

We claim:

1. An electric heater module for heating a gas stream which comprises:
   a cylindrical metal enclosure comprising a wall member of one-piece, closed-curved configuration forming a channel through the enclosure;
   a circumferential support member connected to an inner surface of the wall which extends into the channel to form a first peripheral support surface;
   a conductive metal honeycomb heating element positioned across the channel adjacent the support member and having a first peripheral edge surface in proximity to the inner surface and first peripheral support surface;
   a peripheral compression ring disposed in the channel in proximity to the heating element, the ring being attached to the inner surface of the wall and extending into the channel to form a second peripheral support surface facing a second peripheral edge surface of the heating element;
   at least one layer of refractory resilient insulation material disposed between the edge surfaces of the heating element and each of the inner surface of the wall and the first and second peripheral support surfaces;
   wherein the compression ring is positioned against and fastened to the inner wall by point attachments at a location maintaining a balanced axial compressive force on the insulation material and peripheral edge surfaces of the heating element, said compressive force being diametrically balanced across the diameter of the heating element.

2. An electric heater module in accordance with claim 1 wherein the compression ring is positioned to apply a balanced pressure in the range of about 620–2760 kPa (90–400 psi) to the heating element.

3. An electric heater module in accordance with claim 1 wherein the conductive metal honeycomb heating element comprises an extruded metal honeycomb of flat disk configuration and predetermined diameter and thickness, the disk comprising multiple through-channels traversing the thickness.

4. An electric heater module in accordance with claim 3 which comprises at least one stud electrode attached to an outer circumferential surface of the disk and extending outwardly of the enclosure through a gas-tight feedthrough in the wall member.

5. An electric heater module in accordance with claim 4 wherein the gas-tight feedthrough comprises a flared metal tube fitting having a flared end and a tubular end, the tubular end forming a gas-tight seal around the electrode and the flared end forming a gas-tight seal against the wall member.

6. An electric heater module in accordance with claim 1 wherein the extruded metal honeycomb incorporates multiple slots extending inwardly from the diameter, the slots being separated adjacent the diameter by tab slot separators.

7. An electric heater module in accordance with claim 5 wherein the tab slot separators are formed of metal and are at least partially coated with a refractory dielectric.

* * * * *